FIG.1.

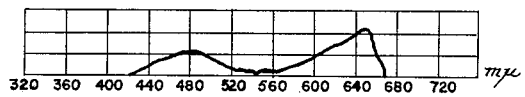

Gelatin Silver Iodobromide Emulsion
Containing Dye Of Example I.
(3:3'-diethyl-5-carbomethoxy-5'-
methylthiaselenacarbocyanine iodide)

FIG.2.

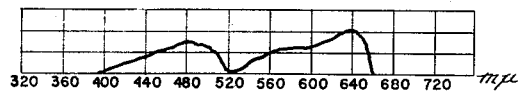

Gelatin Silver Iodobromide Emulsion
Containing Dye Of Example II.
(3:3'-diethyl-5-carbomethoxy-5'-
chlorothiacarbocyanine ethosulfate)

FIG.3.

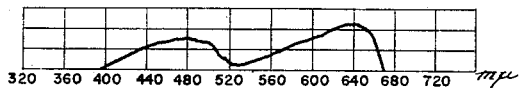

Gelatin Silver Iodobromide Emulsion
Containing Dye Of Example III.
(3:3'-diethyl-5-carbomethoxy-5'-
chlorothiaselenacarbocyanine ethosulfate)

FIG.4.

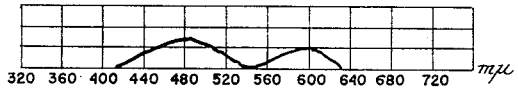

Gelatin Silver Iodobromide Emulsion
Containing Dye Of Example IV.
(3:3'-diethyl-5-carbomethoxy-6'-
ethoxythiacarbocyanine iodide)

INVENTORS
WILLIAM HOWELLS VINTON
JOHN CHARLES FIRESTINE

ATTORNEY

UNITED STATES PATENT OFFICE 2,647,051

PHOTOGRAPHIC EMULSIONS CONTAINING SENSITIZING DYES

William Howells Vinton, Parlin, and John Charles Firestine, South River, N. J., assignors to E. I. du Pont de Nemours & Company, Wilmington, Del., a corporation of Delaware Application February 17, 1951, Serial No. 211,583

5 Claims. (Cl. 95—7)

This invention is concerned with new unsymmetrical carbocyanine dyes. More particularly, it is concerned with unsymmetrical carbocyanine dyes which contain a 5-carbalkoxybenzthiazole radical linked to a benzthiazole or benzselenazole radical through a trimethine chain which may be unsubstituted or contain a hydrocarbon substituent on the central carbon atom of such chain. The invention also relates to photographic silver halide emulsions containing such carbocyanine dyes.

An object of this invention is to provide a new group of carbocyanine dyes. A further object is to provide a group of carbocyanine dyes which confer an extra range of sensitivity to a silver halide emulsion in the red region of the spectrum. A further object of the invention is to provide such a group of carbocyanine dyes which do not have any significant sensitivity in the green region of the spectrum. Another object is to provide new colloid-silver halide emulsions which are "green-blind." Still other objects will be apparent from the following description of the invention.

The above objects are obtained by the preparation and use of the unsymmetrical carbocyanine dyes of this invention which may be represented by the general formula:

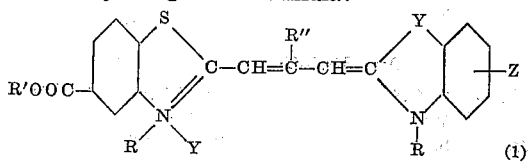

where R is an alkyl radical, R' is an alkyl radical of 1 to 4 carbon atoms, R'' is a hydrogen atom or an alkyl radical of 1 to 3 carbon atoms, X is the negative radical of an acid, Y is a chalcogen taken from the group consisting of sulphur and selenium and Z is a member taken from the group consisting of hydrogen, alkyl of 1 to 3 carbon atoms, aryl of 4 to 10 carbon atoms, chlorine and bromine and alkoxy of 1 to 3 carbon atoms.

Suitable specific radicals for R in the above formula include methyl, ethyl, n-propyl, isopropyl, benzyl; for R' include methyl, ethyl, n-propyl, isopropyl and n-butyl, and for R'' are methyl, ethyl, isopropyl, n-propyl. Suitable acid radicals represented by X are halogen, e. g., Cl, Br and I; perchlorate, SCN, p-toluenesulfonate, methosulfate and ethosulfate.

The dyes of Formula 1 can be made by condensing a 2-(beta-anilino) (or beta-acetanilino)-vinyl-5-carbomethoxy benzothiazole quaternary salt with a 2-methylbenzothiazole or a 2-methylbenzoselenazole quaternary salt in the presence of an acid binding agent, e. g., pyridine, dimethylamine, diethylamine, trimethylamine, piperidine, cyclohexylamine, etc. and heating the admixture under reflux conditions.

PREPARATION A

2-methyl-5-carbomethoxybenzothiazole

To a solution of 60 g. of sodium hydrosulfide in 250 ml. of methanol there was added 8 g. of sulfur, and the resulting solution was filtered to remove a small amount of insoluble material. The resulting solution of sodium disulfide was added dropwise over a period of 2.5 hours to a solution of 110 g. of methyl 4-chloro-3-nitrobenzoate in 250 ml. of methanol heated to reflux. The methyl 3-nitrobenzoate-4-disulfide separated as a solid during the addition of the sodium disulfide. The mixture was cooled to about 20° C., filtered and the filter cake washed with a small amount of methanol. The filter cake was then stirred with warm water to remove the sodium chloride and air dried. This product was reduced with zinc dust and acetic anhydride, and after distillation under reduced pressure (B. P. 160°–165° C. at 1 mm.) was recrystallized from a mixture of benzene and petroleum ether to give colorless crystals of 2-methyl-5-carbomethoxybenzothiazole melting at 96–98° C. The reaction takes place as follows:

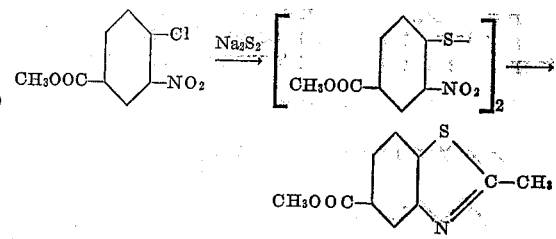

PREPARATION B

2-(β-anilino)vinyl-5-carbomethoxy-benzothiazole diethyl sulfate

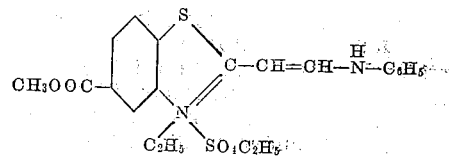

In a suitable heat-resistant glass flask there were placed 20.7 g. of 2-methyl-5-carbomethoxybenzothiazole and 15.4 g. of redistilled diethyl sulfate (0.10 mol). The mixture was heated together for two hours at 120–130° C. in an oil bath. There was then added 20 g. (0.102 mol) of diphenylformamidine. The mixture was then fused at 90° until it produced a solid mass. The product was slurried in alcohol and filtered off. It was then recrystallized from alcohol using decolorizing carbon to remove impurities. There was obtained 18 g. of yellow crystals, having a M. P. 230–232° C. of the quaternary salt of the above formula.

The corresponding N-acetyl derivative can be formed readily by the use of the same reaction plus slightly greater than the theoretical amount of acetic anhydride.

The carbocyanine dyes of Formula 1 have been found to be quite useful photographic sensitizing dyes. When added to a colloid-silver halide emulsion they confer an extra range of sensitivity thereto in the red region of the spectrum with no substantial sensitivity in the green region of the spectrum. They constitute new "green-blind" sensitizing dyes. These dyes have the additional advantage that finished photographs are quite free from residual stain. The dyes are not limited in their use to any particular type of light-sensitive silver halide emulsion but they may be incorporated in colloid-silver halide emulsions of various types including silver chloride, silver bromide, silver chlorobromide, silver iodobromide, simple and mixed emulsions. Various types of water-permeable or hydrophilic colloids can be used as the binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, polyvinyl acetals, etc., hydrophilic colloid color formers, e. g., polyvinyl acetals of color-forming aldehydes.

The preparation of representative unsymmetrical carbocyanine dyes of this invention will now be described in the following examples.

Graphs of spectrograms of gelatin silver halide emulsions containing the respective dyes of the following examples are shown in the accompanying drawing, wherein, Fig. 1 is a spectrogram of the dye of Example I in a gelatin silver iodobromide emulsion, Fig. 2 is a spectrogram of the dye of Example II in a gelatin silver iodobromide emulsion, Fig. 3 is a spectrogram of the dye of Example III in a gelatin silver iodobromide emulsion, and Fig. 4 is a spectrogram of the dye of Example IV in a gelatin silver iodobromide emulsion.

EXAMPLE I

Preparation of dye of the formula:

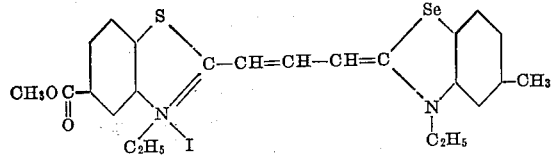

In a suitable reaction vessel there were placed 2.32 g. 2-(beta-anilino)vinyl-5-carbomethoxybenzothiazole ethyl ethosulfate, 1.83 g. of 2,5-dimethylbenzoselenazole ethiodide, 20 ml. of dry pyridine and 5 ml. of acetic anhydride. The mixture was heated under conditions of reflux for five minutes. A deep purple color formed and the dye crystallized out of solution. The dye was filtered off, washed with water and then recrystallized twice with ethyl alcohol. The sparkling green crystals of the dye (3:3'-diethyl-5-carbomethoxy - 5' - methylthiaselenacarbocyanine iodide) of the above formula which were obtained had a melting point of 254° to 255° C. An ethanol solution of the dye had an absorption maximum at 568 millimicrons.

A small amount of the dye was added to a gelatino silver iodobromide emulsion of the negative type and was found to confer an extra range of sensitivity to such emulsion extending from 550 millimicrons to 672 millimicrons.

EXAMPLE II

Preparation of the dye of the formula:

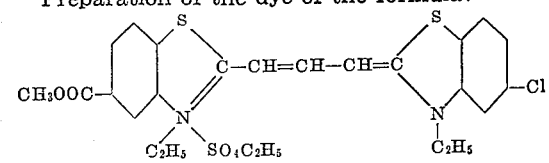

In a suitable heat-resisting glass flask there were placed 1.83 g. of 2-methyl-5-chlorobenzothiazole and 1.54 g. of diethyl sulfate. The mixture was heated for two hours at 120–130° C. and then 4.18 g. of 2-(beta-anilino)vinyl-5-carbomethoxybenzothiazole ethyl ethosulfate and 20 ml. of dry pyridine were added. The mixture was heated to reflux for 30 minutes and a brilliant purple color formed and the dye crystallized out of solution. The dye (3:3'-diethyl-5-carbomethoxy-5'-chlorothiacarbocyanine ethosulfate) which had the above formula was filtered, washed, recrystallized several times from ethyl alcohol whereupon sparkling purple crystals of the dye having a melting point of 266–267° C. were obtained.

An ethanol solution of this dye showed an absorption maximum at 560 millimicrons. When a small amount of the dye was added to a gelatino iodobromide emulsion of the negative type, it was found to extend its sensitivity to 660 millimicrons with a maximum at 640 millimicrons.

When a small amount of the dye was added to a gelatino silver bromochloride emulsion of the lithographic type it extended the sensitivity from 530 to 621 millimicrons with a maximum at 596 millimicrons. The emulsion evidenced little sensitivity in the green region of the spectrum.

EXAMPLE III

Preparation of dye of the formula:

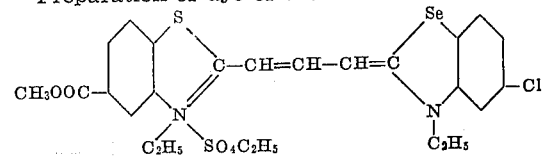

In a suitable heat-resisting glass flask there was placed 1.15 g. of 2-methyl-5-chlorobenzoselenazole and 0.77 g. of diethyl sulfate. The mixture was heated for two hours at 120°–130° C. and 2.32 g. of 2-(beta-anilino)vinyl-5-carbomethoxybenzothiazole ethyl ethosulfate and 20 ml. of dry pyridine were then added and the mixture was heated under refluxed conditions for 30 minutes. A deep purple color formed and the dye crystallized out on cooling. The dye (3:3'-diethyl-5-carbomethoxy-5'- chlorothiaselenacarbocyanine ethosulfate) which had the above formula was filtered off, washed with water, and recrystallized twice from ethyl alcohol. The sparkling purple crystals of this dye had a melting point of 275°–277° C.

An ethanol solution of the dye showed an absorption maximum at 6170 Å. units. A small amount of the dye was added to a gelatino iodobromide emulsion of the negative type and was found to extend its sensitivity to 660 millimicrons with a maximum at 640 millimicrons.

EXAMPLE IV

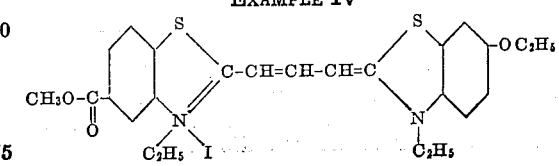

In a suitable flask there were placed 2.45 grams 2-methyl-6-ethoxybenzothiazole ethiodide, 2.32 grams 2(beta-anilinovinyl)-5-carbomethoxybenzothiazole ethyl ethosulfate, 20 ml. dry pyridine and 5 ml. of acetic anhydride. The mixture was heated to reflux for 5 minutes and a purple color formed. On cooling the dye precipitated out of solution. The dye was filtered off, washed with ethyl alcohol and recrystallized twice from ethyl alcohol. A yield of 1.14 g. of purple dye was obtained which melted at 257°–258° C. An ethanol solution of the dye showed an absorption maximum at 562 millimicrons. A small amount of the dye (3:3'-diethyl-5-carbomethoxy-6'-ethoxythiacarbocyanine iodide) was added to a gelatino silver iodobromide emulsion and extended the sensitivity to 630 millimicrons with a sensitivity maxmum at 600 millimicrons. The emulsion evidenced substantially no sensitivity in the green region of the spectrum.

Various other unsymmetrical carbocyanine dyes containing different alkyl halide or ester radicals than those described in the foregoing examples can be made in a similar manner by substituting for the diethyl sulfate other alkyl salts such as ethyl p-toluenesulfonate, methyl p-toluenesulfonate, ethyl iodide, methyl chloride and ethyl benzenesulfonate.

The ethyl ethosulfate quaternary salts of the foregoing example can be converted into the quaternary salt by a metathetical reaction, e. g., into the corresponding bromide or iodide by the addition of sodium iodide, potassium bromide, ammonium chloride; potassium thiocyanate, etc.

Similarly, in place of the 2-(beta-anilino)-vinyl-5-carbomethoxybenzothiazole diethyl ethosulfate there may be substituted other carbalkoxybenzothiazole derivatives, e. g., the corresponding carbethoxy, carbo-n-propoxy and carbo-n-butoxy, carbo-tertiary butoxy, etc.

In place of the 2-methyl-5-chlorobenzothiazole, 2-methyl-5-chlorobenzoselenazole and 2,5-dimethylbenzoselenazole there may be substituted other benzthiazoles or benzselenazoles which contain a substituent having the value Z in Formula 1. Among the useful reactants are 2-methyl-6-ethoxybenzothiazole, 2 - methylbenzoselenazole, 2-methyl-4-(beta-benzothiophene)-thiazole, 2,5-dimethylbenzothiazole, 2-methyl-5-bromobenzothiazole, 2-methyl-5-bromobenzoselenazole, 2-methyl-5-propoxy-benzoselenazole, 2-methyl-5-phenylbenzothiazole.

An advantage of this invention is that it provides the art with a new group of sensitizing dyes. These dyes are of considerable importance in color photography because they do not confer any significant sensitivity in the green region of the spectrum. They are also non-migratory and thus advantageous in multi-layer color photographic elements.

As many widely different embodiments of this invention can be made without departing from the spirit and scope thereof, it is to be understood that the invention is not to be limited except as defined by the claims.

What is claimed is:

1. A water-permeable colloid silver halide emulsion layer containing a compound having the general formula:

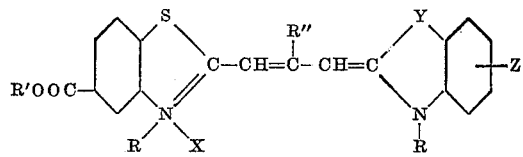

where R is an alkyl radical, R' is an alkyl radical of 1 to 4 carbon atoms, R'' is a member taken from the group consisting of hydrogen and alkyl radicals of 1 to 3 carbon atoms, X is the negative radical of an acid, Y is a chalcogen taken from the group consisting of S and Se and Z is a member taken from the group consisting of hydrogen, alkyl of 1 to 3 carbon atoms, aryl of 6 to 10 carbon atoms, chlorine, bromine and alkoxy of 1 to 3 carbon atoms.

2. A gelatino silver halide emulsion containing a compound having the general formula:

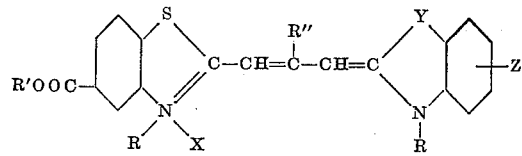

where R is an alkyl radical, R' is an alkyl radical of 1 to 4 carbon atoms, R'' is a member taken from the group consisting of hydrogen and alkyl radicals of 1 to 3 carbon atoms, X is the negative radical of an acid, Y is a chalcogen taken from the group consisting of S and Se and Z is a member taken from the group consisting of hydrogen, alkyl of 1 to 3 carbon atoms, aryl of 6 to 10 carbon atoms, chlorine, bromine and alkoxy of 1 to 3 carbon atoms.

3. A water-permeable colloid silver halide emulsion containing the compound of the formula:

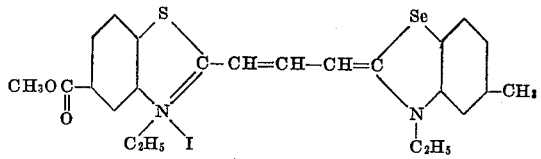

4. A water-permeable colloid silver halide emulsion containing the compound of the formula:

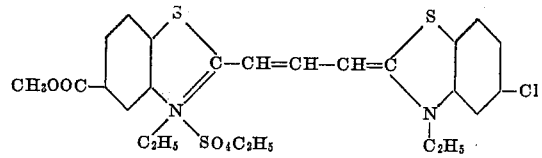

5. A water-permeable colloid silver halide emulsion containing the compound of the formula:

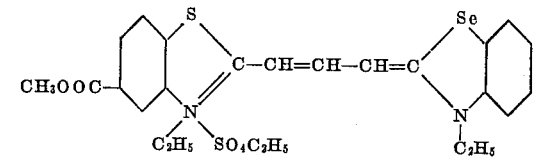

WILLIAM HOWELLS VINTON.
JOHN CHARLES FIRESTINE.

References Cited in the file of this patent

UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |